United States Patent

Muff et al.

(10) Patent No.: US 9,465,613 B2
(45) Date of Patent: Oct. 11, 2016

(54) INSTRUCTION PREDICATION USING UNUSED DATAPATH FACILITIES

(75) Inventors: Adam J. Muff, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 13/330,102

(22) Filed: Dec. 19, 2011

(65) Prior Publication Data

US 2013/0159675 A1 Jun. 20, 2013

(51) Int. Cl.
*G06F 9/30* (2006.01)
*G06F 9/38* (2006.01)

(52) U.S. Cl.
CPC ....... *G06F 9/30072* (2013.01); *G06F 9/30101* (2013.01); *G06F 9/30185* (2013.01); *G06F 9/3802* (2013.01)

(58) Field of Classification Search
CPC .................................................. G06F 9/30072
USPC ........................................................ 712/226
See application file for complete search history.

(56) References Cited

U.S. PATENT DOCUMENTS

| 5,226,128 | A | 7/1993 | Rau |
| 5,890,222 | A * | 3/1999 | Agarwal et al. ............ 711/220 |
| 6,651,247 | B1 | 11/2003 | Srinivassan |
| 6,910,123 | B1 | 6/2005 | Bosshart |
| 7,178,011 | B2 * | 2/2007 | Seal et al. .................... 712/226 |
| 7,269,719 | B2 | 9/2007 | Colavin et al. |
| 7,698,449 | B1 * | 4/2010 | Keller et al. ................. 709/231 |
| 2002/0091996 | A1 | 7/2002 | Topham |
| 2004/0088526 | A1 * | 5/2004 | Colavin et al. .............. 712/226 |
| 2004/0210886 | A1 * | 10/2004 | Jarp et al. .................... 717/159 |
| 2006/0055701 | A1 | 3/2006 | Taylor |
| 2008/0016327 | A1 * | 1/2008 | Menon et al. ................ 712/218 |
| 2008/0040586 | A1 | 2/2008 | Colavin et al. |
| 2009/0288063 | A1 | 11/2009 | Rangan et al. |
| 2014/0229711 | A1 * | 8/2014 | Muff et al. ................... 712/208 |
| 2014/0229712 | A1 * | 8/2014 | Muff et al. ................... 712/208 |

OTHER PUBLICATIONS

U.S. Patent and Trademark Office, Office Action issued in related U.S. Appl. No. 13/766,374 dated Oct. 23, 2015.
U.S. Patent and Trademark Office, Office Action issued in related U.S. Appl. No. 13/779,189 dated Nov. 2, 2015.

* cited by examiner

*Primary Examiner* — Andrew Caldwell
*Assistant Examiner* — Keith Nielsen
(74) *Attorney, Agent, or Firm* — Middleton Reutlinger

(57) ABSTRACT

A method and circuit arrangement for selectively predicating an instruction in an instruction stream based upon a value corresponding to a predication register address indicated by a portion of an operand associated with the instruction. A first compare instruction in an instruction stream stores a compare result in at a register address of a predication register. The register address of the predication register is stored in a portion of an operand associated with a second instruction, and during decoding the second instruction, the predication register is accessed to determine a value stored at the register address of the predication register, and the second instruction is selectively predicated based on the value stored at the register address of the predication register.

20 Claims, 8 Drawing Sheets

INSTRUCTION PREDICATION USING UNUSED DATAPATH FACILITIES

FIELD OF THE INVENTION

The invention is generally related to data processing, and in particular to processor architectures and execution units incorporated therein.

BACKGROUND

Instruction predication is a valuable feature in some processor architectures. Predication facilitates the prevention of execution of instructions in an instruction stream, which is referred to as "predicating" an instruction. Instruction predication is generally used in execution units performing algorithms that rely on loops and/or conditional branches and decision making. Instruction predication may be used, for example, in an algorithm utilizing a loop, where instructions implementing the loop are to be skipped when the loop is exited. As such, the instructions to be skipped when exiting the loop may be predicated in an instruction stream. In another example, a conditional instruction may have two possible outcomes, where instructions of one branch may be skipped depending on the resolution of the conditional instruction. As such, instruction predication logic predicates (i.e., prevents execution of) instructions corresponding to the branch not "taken" by the conditional instruction.

For example, image processing algorithms implemented in some three dimensional (3D) graphics applications incorporate a z-buffer algorithm test. In such 3D graphics applications, great care must be taken to avoid drawing objects that would not be visible, such as when an opaque object is closer to the camera than another object. In such a case, the object closer to the camera would block the farther object, and a 3D application that is attempting to draw this scene must not draw the further object. A z-buffer generally refers to a set of values that represent distance from the camera (sometimes called depth) for each pixel. Every time the rasterizing algorithm is ready to draw a pixel, it compares the depth of the pixel it is attempting to draw with the depth of the z-buffer for that pixel. If the z-buffer value indicates that the existing pixel is closer to the camera, the new pixel is not drawn and the z-buffer value is not updated. In contrast, if the new pixel to be drawn is closer to the camera, the new pixel is drawn and the z-buffer is updated with the new depth associated with that pixel. In a pixel shader of the 3D application, the algorithm may draw a pixel and update the z-buffer if the new pixel is closer to the camera than the older pixel stored in the z-buffer, but if the new pixel is not closer to the camera, the instructions following the z-buffer compare should be skipped and the next pixel should be tested. As such, predication may be utilized to skip instructions for a pixel depending on the outcome of the z-buffer compare.

In conventional processor architectures utilizing instruction predication, predication of an instruction is generally controlled by a state of a predication register. Each instruction in the instruction stream includes a predication register address portion corresponding to an address in the predication register, where the data stored at the register address indicates whether to predicate the instruction. As such, data of a predication register address may be adjusted to indicate whether to predicate an instruction, where the instruction will include data indicating the predication register address the processor may access to determine whether to predicate the particular instruction. For example, in the VLIW IA-64 processor architecture, a 64 bit predication register and 128 bit 3-instruction bundles are utilized, where each instruction includes a 41 bit instruction size and a predication field of 6-bits in the 41 bit instruction that determines which register address of the predication register is used to determine whether to predicate the instruction.

However, in some fixed instruction length processor architectures, using bits of an instruction for a predication field uses up valuable space in the instruction that otherwise may be used for register addresses, opcodes, and/or other such data. As such, in some processor architectures, and particularly smaller fixed length instruction architectures, utilizing bits of an instruction for a predicate field may reduce the number of possible opcodes, source and/or target addresses that may be utilized in a processor using the architecture.

Therefore, a continuing need exists in the art for implementing instruction predication in processor architectures, and desirably without dedicating bits of an instruction to a predication field.

SUMMARY OF THE INVENTION

The invention addresses these and other problems associated with the prior art by selectively predicating instructions in an instruction stream based on a value at a register address of a predication register, where the register address is indicated by a portion of an operand associated with an instruction, and the value at the register address of the predication register is set by storing a compare result generated by the execution of a compare instruction in the instruction stream. Predication logic consistent with embodiments of the invention analyzes an operand associated with a respective instruction to determine a predication register address indicated by a portion of the operand, and the predication logic selectively predicates the respective instruction based at least in part on a value stored at the predication register address.

Advantageously, embodiments of the invention facilitate instruction predication in an instruction stream utilizing unused and/or logically non-significant portions of an operand associated with an instruction to store a predicate register address which stores a value indicating whether to predicate the instruction. As such, some embodiments of the invention data bits of the instruction are not dedicated to a predication field, but may be utilized for opcodes and/or operand addresses.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments consistent with the invention selectively predicate instructions in an instruction stream utilizing a predication register. In some embodiments of the invention, a first compare instruction is executed to generate a compare result, which is stored in a predication register address of a predication register. The predication register address is stored in a portion of an operand associated with a second instruction, and predication logic analyzes the second instruction and the operand to determine the predication register address stored in the portion of the operand. The predication logic determines whether to predicate the second instruction based on the predication register address which stores the compare result. As such, the predication logic selectively predicates the second instruction based on the compare result stored at the predication register address, where the predication register address is determined from the portion of the operand.

Hardware and Software Environment

Figure 1:
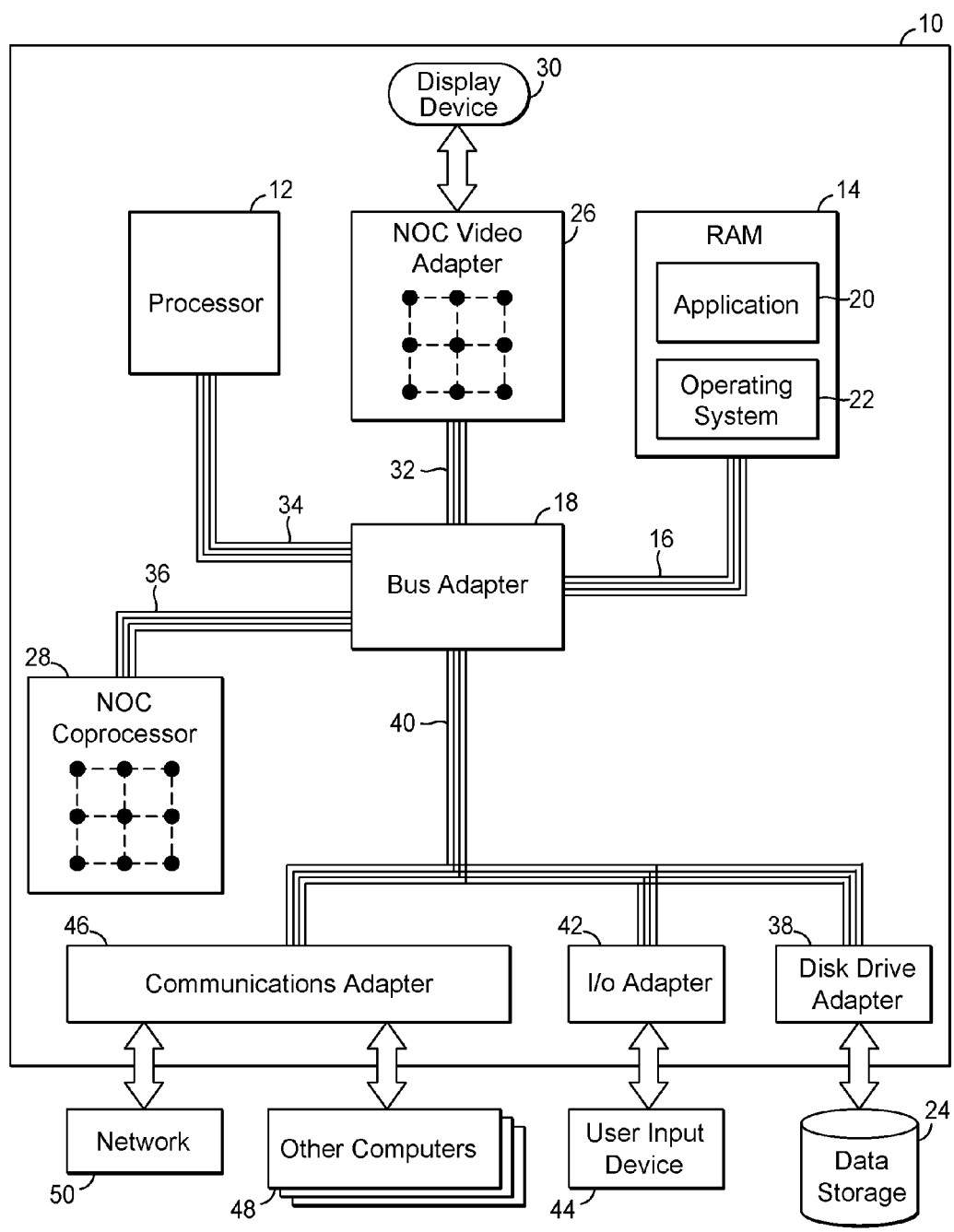
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
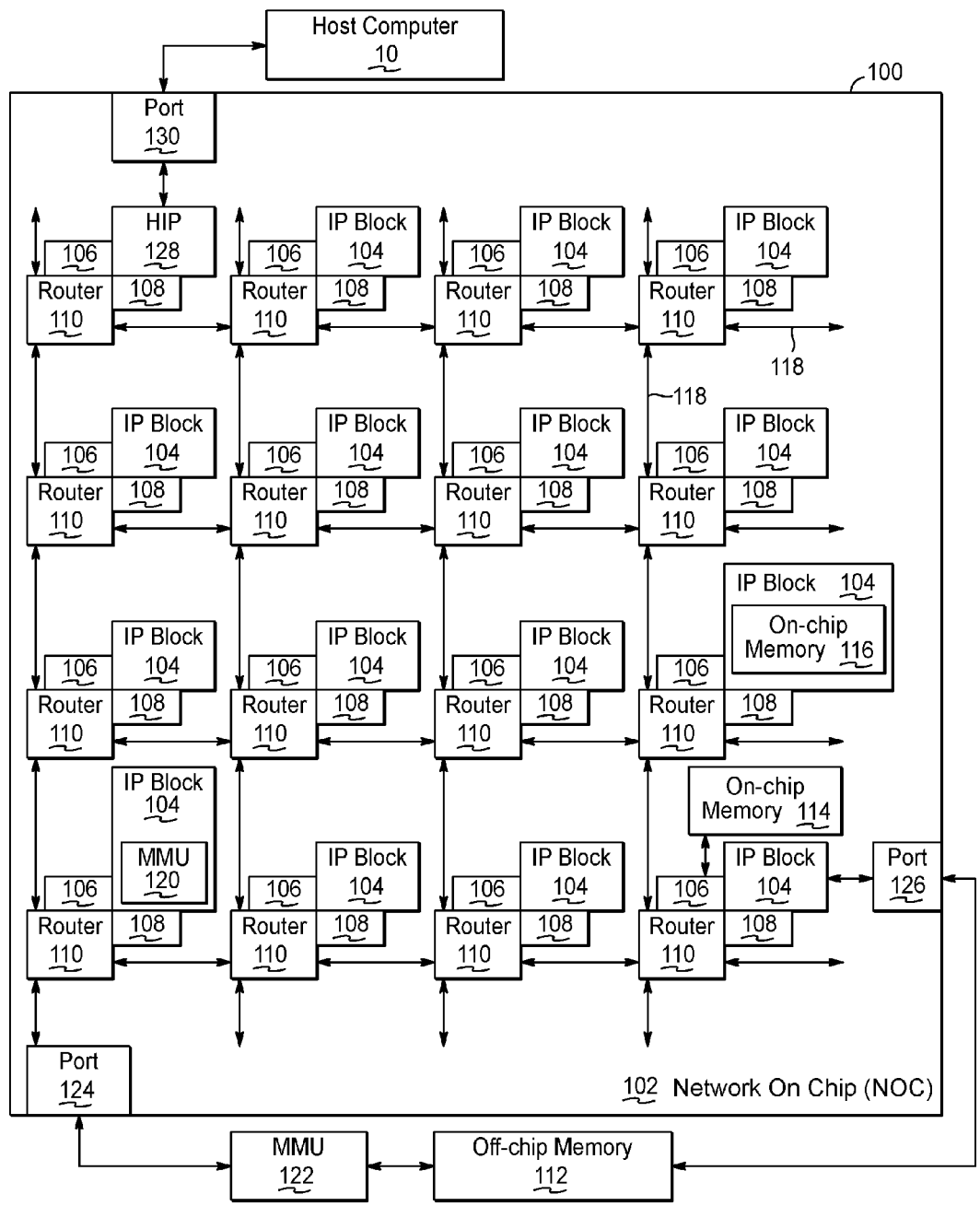
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
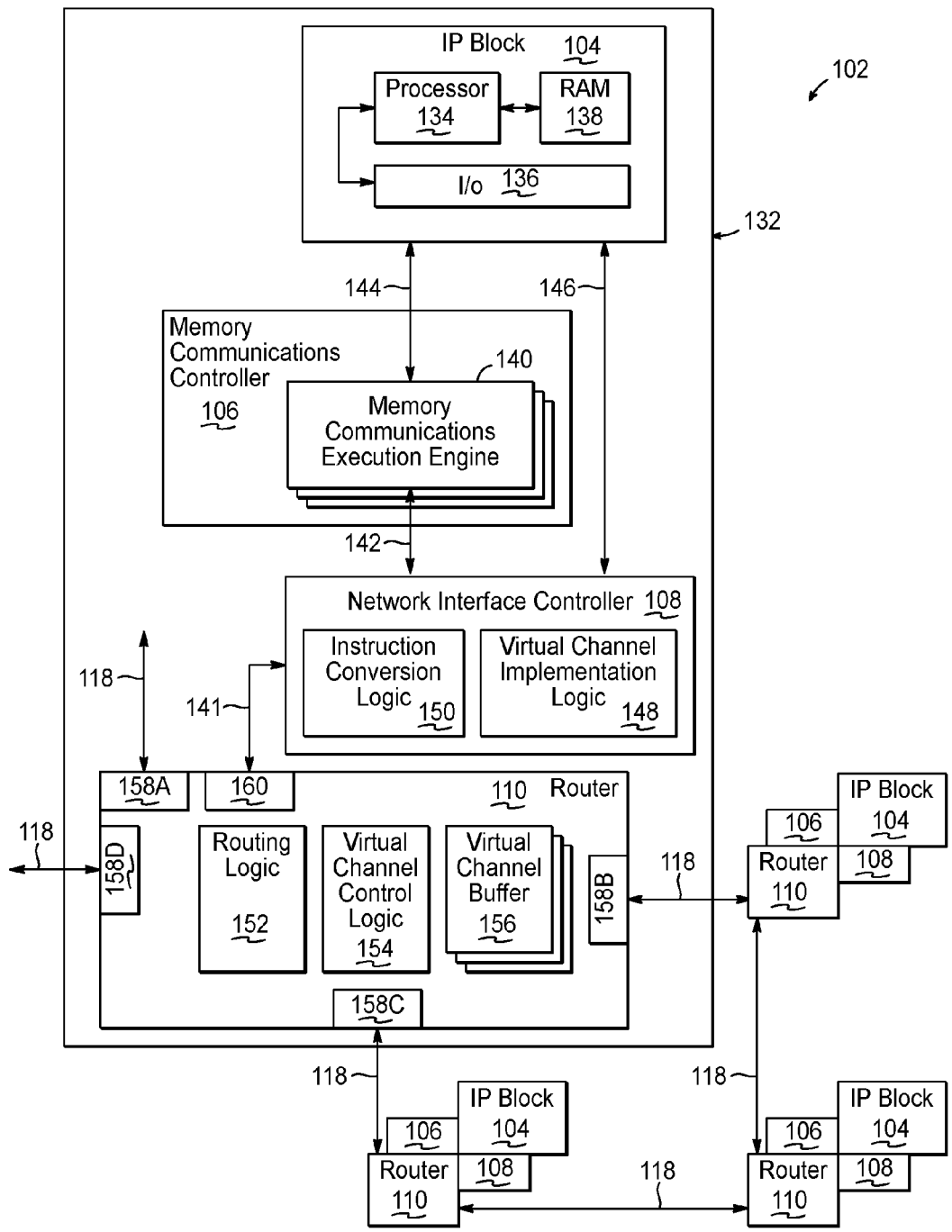
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
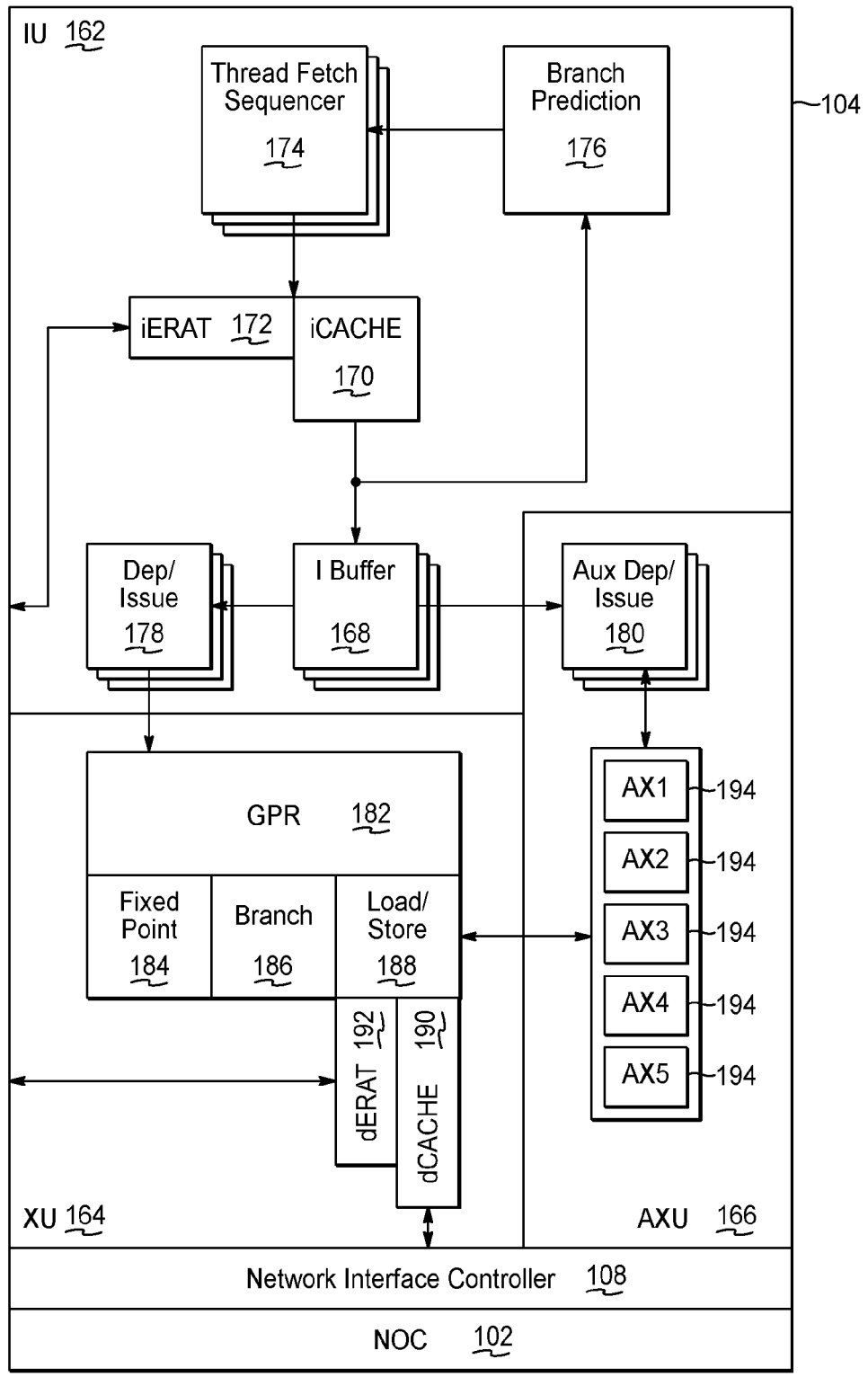
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multi-threaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Instruction Predication Using Unused Datapath Facilities

Processing units (i.e., processors) consistent with some embodiments of the invention utilize an architected predication register where a value stored at a particular address of the predication register indicates whether an instruction in an instruction stream should be predicated. A first compare instruction in the instruction stream is executed to generate a compare result which is stored at a respective predication register address of the predication register. The respective predication register address may be stored as a portion of an operand associated with a second instruction in the instruction stream. Substantially in parallel with decoding the second instruction for execution by the processor, the operand is accessed to determine the respective predication register address, and the second instruction is selectively predicated based on a value stored at the respective predication register address, where the value is the compare result generated from execution of the first compare instruction in the instruction stream.

As such, in embodiments of the invention, a predication register address that is referenced to determine whether to predicate an instruction in an instruction stream is stored as a portion of an operand associated with the instruction. In some embodiments, the portion of the operand may be bits of an operand that are unused based on the type of instruction the operand is associated with. For example, an operand for single precision floating point instruction may be stored in a double precision floating point register, and as such the last thirty two bits of the operand may not be logically significant and/or unused in the instruction (referred to herein as "unused dataflow bits"). In embodiments of the invention, a predication register address is stored in a portion of the logically non-significant bits of an operand for certain types of instructions. In some embodiments, in parallel with decoding such instructions, the portion of the operand is utilized to determine a predication register address to access to determine whether to predicate the instructions.

In addition, as only certain types of instructions may include operands having unused dataflow bits, embodiments of the invention may include an enable bit in instructions, where the enable bit indicates whether an instruction is predicatable (i.e., a type of instruction that may be associated with an operand having unused dataflow bits) consistent with embodiments of the invention. As such, prior to accessing an operand of an instruction to determine a predication register address, some embodiments of the invention may determine whether the instruction is predicatable based on the enable bit in the instruction. Furthermore, in some embodiments, a counter register may be associated with the processing unit, where a counter value may be stored in the counter register by an instruction in the instruction stream, and the counter value may indicate a number of instructions in the instruction stream following a first compare instruction that may be selectively predicated based on the compare result.

Figure 5:
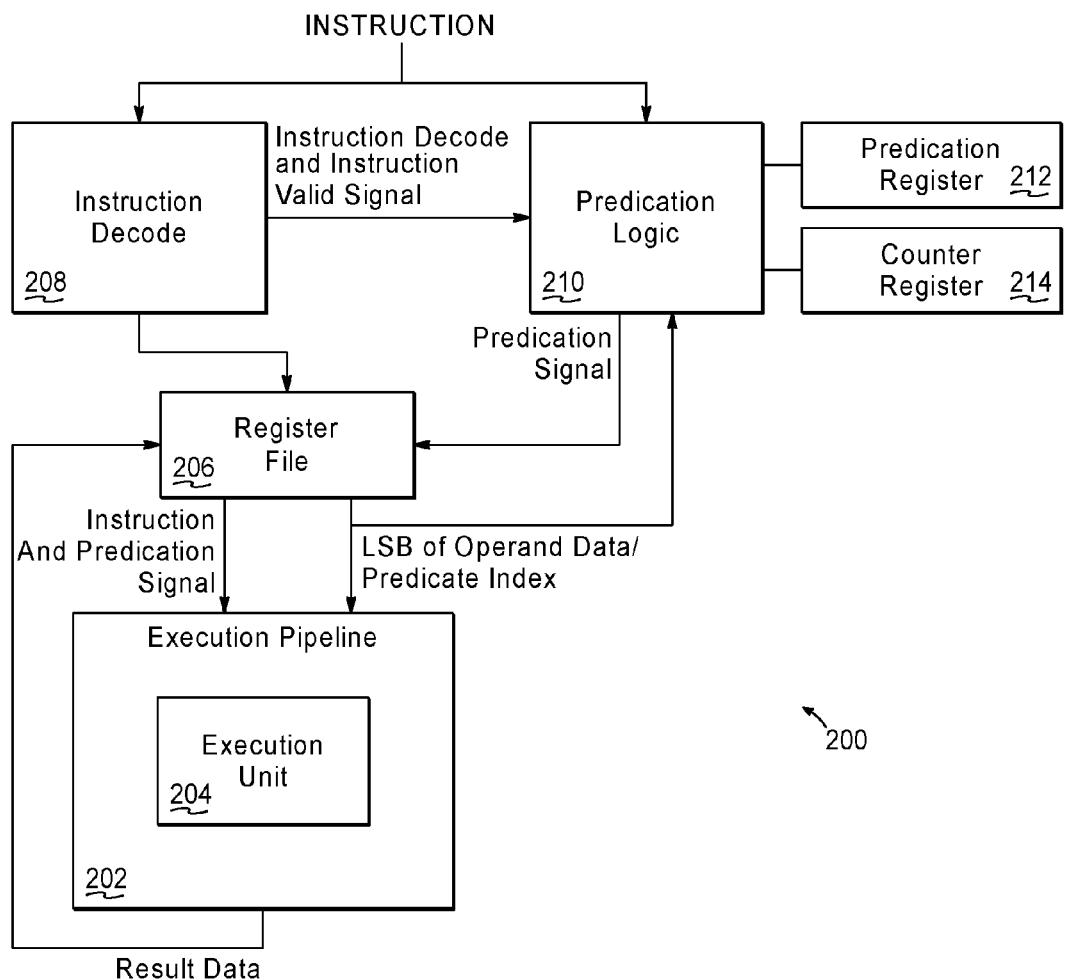
FIG. 5 is a block diagram illustrating an exemplary implementation of an IP block from the NOC of FIG. 2 or the processor of FIG. 1, and incorporating predication logic suitable for predication consistent with the invention.

Turning now to FIG. 5, this figure provides a block diagram of a processor 200 that may be implemented as a processor of the computer of FIG. 1 and/or in as an IP block of the NOC of FIG. 2. The processor 200 includes an execution pipeline 202 including an execution unit 204 for executing instructions in an instruction stream. A register file 206 is coupled to the execution pipeline 202 such that instructions and operand data may be input into the execution pipeline 202 for processing by the execution unit 204. Instruction decode logic 208 is coupled to the register file 206, where instruction decode logic decodes instructions in the instruction stream for execution by the execution unit 204. As such, register file 206 may store decoded instructions from instruction decode logic 208 prior to execution by the execution unit 204. In embodiments of the invention, the processing unit 200 may include predication logic 210 associated with the instruction decode logic 208, where the predication logic is configured to analyze instructions in the instruction stream to determine whether to predicate the instructions. In addition, in some embodiments, processor 200 may include a predication register 212 and/or a counter register 214.

Consistent with embodiments of the invention, the predication logic 210 may analyze a respective instruction to determine whether to predicate the respective instruction by accessing the predication register 212 to determine a predication register address indicated by a portion of the operand stored in the register file 206. The predication logic 210 accesses the predication register address stored in the predication register 206 and determines whether to predicate the respective instruction based on the value stored at the predication register address. In some embodiments, the register file 206 may store the predication register 212 and in some embodiments, the predication register may be a special purpose register file. The predication register address may correspond to a value (e.g., a bit value such as a '0' or '1') where the stored value indicates whether to predicate an instruction referencing an operand which includes the predication register address. As such, the predication logic 210 may receive operand data and predication register address data from the register file 206 and/or from the predication register 212.

Furthermore, in some embodiments, instructions an instruction stream may depend on results generated by a previously executed instruction. In embodiments of the invention, a portion of an operand indicating a respective predication register address may be passed from one instruction to another instruction by including the portion of the operand indicating the respective predication register address in results data. As such, consistent with embodiments of the invention, a first instruction selectively predicated in an instruction stream may still generate results data. A predicated execution of the first instruction generates predicated results data which may be stored in a target operand referenced by the first instruction. The predicated results data does not generate data for logically significant bits in of the target operand, but stores the unused dataflow bits from a source operand into the unused data bits of the target operand. As discussed above, the unused dataflow bits of a source operand for certain types of instructions may be utilized to indicate a predication register address. Hence, a first instruction may pass a predication register address from a source operand associated with the first instruction to a source operand of a second, dependent instruction by storing unused dataflow bits of the source operand associated with the first instruction to a target operand associated with the first instruction, where the target operand of the first instruction may be used as one source operand of the second instruction. Hence, unused data bits indicating a respective predication register address may be stored in a target operand even if an instruction is predicated, and, the target operand may be used as a source operand in a second, dependent instruction, such that the unused data bits indicating the respective predication register address are including in an operand associated with the second instruction. Hence, in these embodiments, the unused dataflow bits indicating a respective predication register address may be passed to subsequent instructions depending on the results data generated by a first instruction. Therefore, if the first instruction is predicated based on a value at a respective predication register address, subsequent instructions depending on the results data generated by the first instruction would be associated with a source operand including a portion indicating the respective predication register address, such that the subsequent instructions would be predicated as well.

Figure 6:
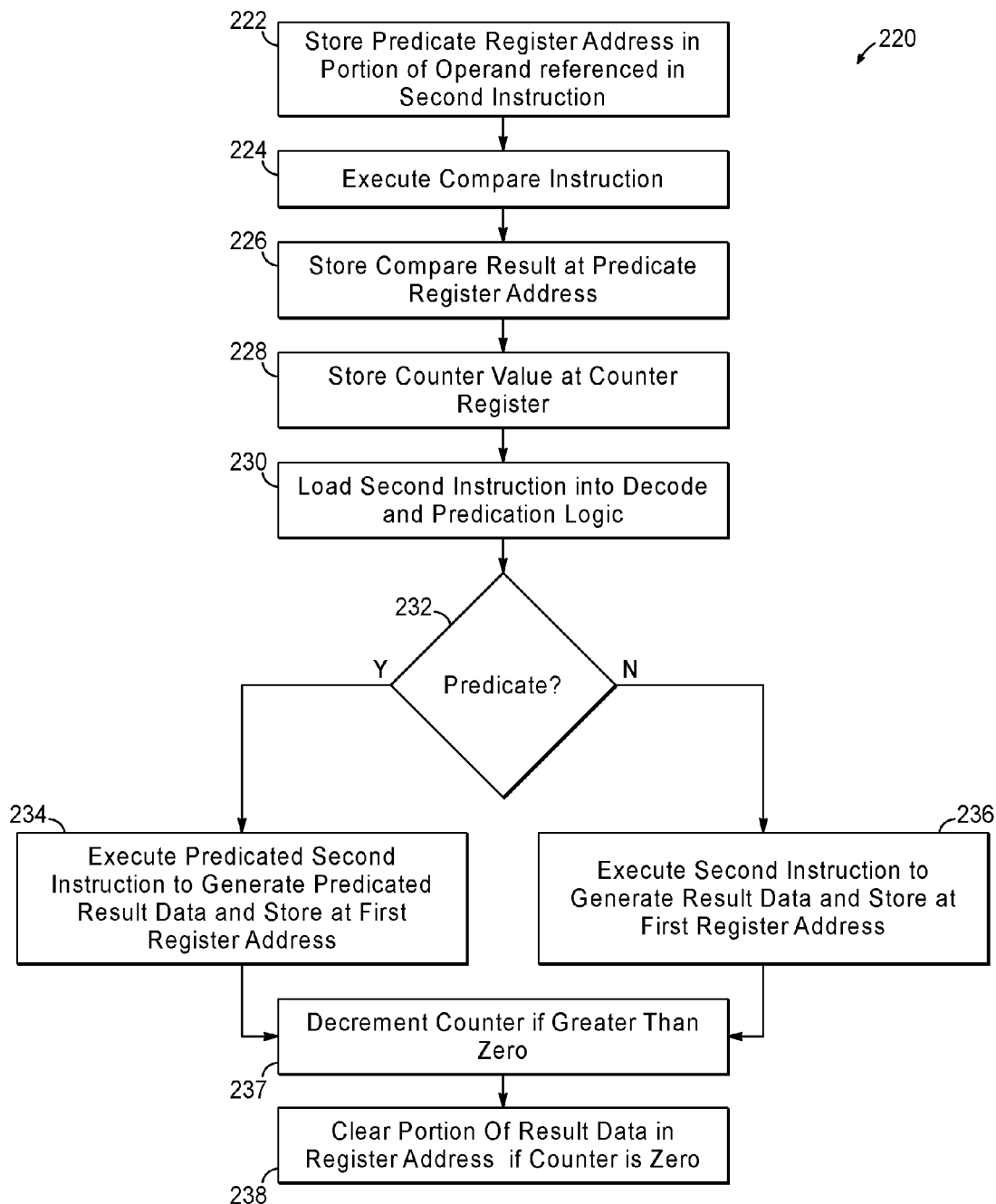
FIG. 6 is a flowchart illustrating an exemplary sequence of operations that may be performed by the processor of FIG. 5 to selectively predicate instructions in an instruction stream.

FIG. 6 provides a flowchart 220 illustrating a sequence of operations that may be performed by a processor consistent with embodiments of the invention to selectively predicate instructions in an instructions stream based on a value stored in a predication register address indicated by a portion of an operand associated with a respective instruction. A respective predication register address is stored in a portion of an operand associated with a second instruction (block 222). A first compare instruction is executed to generate a compare result (block 224), and the compare results is stored at the respective predication register address (block 226). A counter value is stored at a counter register (block 228), where the counter value may indicate the number of instructions that may be selectively predicated based on the compare instruction. A second instruction is loaded into decode logic and predication logic (block 230), and the predecode logic analyzes the second instruction to determine whether to selectively predicate the second instruction (block 232). The predication logic may access a register file storing the operand associated with the second instruction to determine the predication register address indicated by the portion of the operand, and the predication logic may access the predication register to determine the value stored at the predication register address indicated by the portion of the operand. The predication logic determines whether to predicate the instruction based at least in part on the value of the predication register address and the counter value.

In response to determining to predicate the instruction ("Y" branch of block 232), predicated execution of the second instruction is performed such that predicated result data is generated and stored at a first, target operand register address (block 234). In response to determining to execute the instruction (i.e., not predicate the instruction) ("N" branch of block 232), the second instruction may be executed to generate result data which may be stored at the first, target operand register address (block 236). The predication logic may decrement the counter register if the counter register is greater than zero (block 237), and the predication logic may clear a portion of the result data generated in blocks 234 or 236 from the register address corresponding to the target operand in response to the counter register being decremented to zero (block 238).

As discussed previously, in some embodiments of the invention, a portion of an operand indicating a respective predication register address may be passed from a preceding instruction to a subsequent instruction which depends on results from the previous instruction by allowing a predicated instruction to still store predicated results data in a target operand. However, embodiments of the invention are not so limited. In some embodiments, a portion of an operand indicating a respective predication register address may not be passed to dependent instructions, and in such embodiments, a predicated instruction may not store predicated results data in a target operand.

Figure 7:
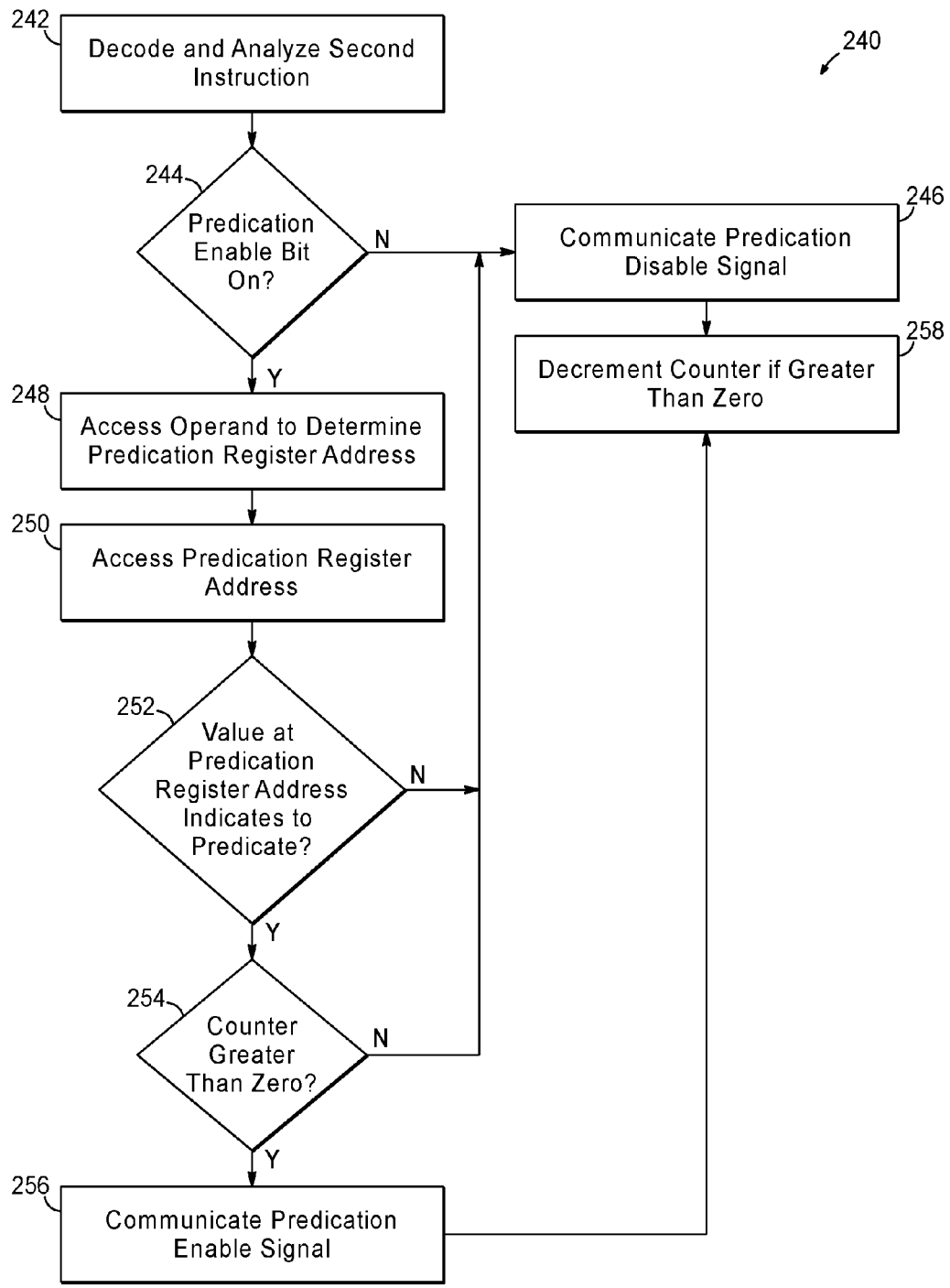
FIG. 7 is a flowchart illustrating an exemplary sequence of operations that may be performed by the predication logic of FIG. 5 to determine whether to predicate an instruction.

FIG. 7 provides a flowchart 240 illustrating a sequence of operations that may be performed by a predication logic of a processor consistent with some embodiments of the invention to determine whether to predicate an instruction in the instruction stream. A respective instruction is loaded into decode logic for decoding and the predication logic (block 242). The predication logic determines whether a predication enable bit indicates the respective instruction is a predicatable instruction (i.e., a type of instruction that may be associated with an operand including a portion indicating a predication register address) (block 244); i.e., the predication enable bit may be "on" to indicate that the respective instruction is predicatable and may be "off" to indicate that the respective instruction is not predicatable.

In response to determining that the predication enable bit indicates that the respective instruction is not predicatable ("N" branch of block 244), the predication logic communicates a predication signal indicating that the respective instruction should be executed normally (i.e., not predicated) (block 246). In response to determining that the predication bit indicates that the respective instruction is predicatable ("Y" branch of block 244), the predication logic accesses a register address for an operand associated with the respective instruction to determine a predication register address indicated by a portion of the operand (block 248). The predication logic accesses a predication register (block 250) to determine the value stored at the predication register address (block 250). The predication logic determines whether the predication register address indicates to predicate the respective instruction (block 252). The predication register address may generally store a value (e.g., a bit value), where one possible value stored at the predication register address may indicate to predicate the respective instruction, and a second possible value may indicate to execute the respective instruction (i.e., not predicate the instruction). As described herein, in some embodiments, a compare instruction stores a compare result at the predication register address, hence the value stored at the predication register address is based on the compare instruction. Therefore, in some embodiments, an instruction is selectively predicated based on the compare result by storing the compare result at a predication register address.

In response to determining that the predication register address indicates to not predicate the instruction (i.e., execute the instruction) ("N" branch of block 252), the predication logic communicates a predication disable signal indicating that the respective instruction should be predicated. In response to determining that the predication register address indicates to predicate the instruction ("Y" branch of block 252), the predication logic determines whether a counter register associated with the predication logic is greater than zero (block 254). In response to determining that the counter register is not greater than zero ("N" branch of block 254), the predication logic communicates a predication disable signal (block 246), which indicates that the instruction should be executed (i.e., not predicated). In response to determining that the counter register is greater than zero ("Y" branch of block 254), the predication logic communicates a predication enable signal indicating that the instruction should be predicated (block 256). In some embodiments, a counter register may be set, where the counter register indicates a number of instructions following a compare instruction that may be selectively predicated. Following communication of a predication disable signal (block 246) or a predication enable signal (block 256), the predication logic may decrement the counter register if the counter register is greater than zero (block 258).

As such, in embodiments of the invention performing operations consistent with flowchart 240, the predication logic may determine a predication register address for a predicatable instruction by accessing an operand associated with the instruction, where a portion of the operand may include the predication register address. The predication logic may utilize the determined predication register address to determine whether to selectively predicate the instruction. In addition, a counter register may be utilized by embodiments of the invention such that only instructions within a given number of instructions following a compare instruction may be selectively predicated.

Figure 8:
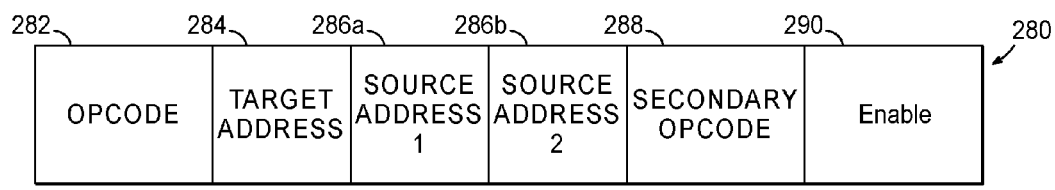
FIG. 8 is block diagram illustrating an exemplary embodiment of an instruction that may be analyzed by the processor of FIG. 5.

FIG. 8 is an exemplary instruction 280 that may be provided to predication logic consistent with embodiments of the invention. As shown, the instruction 280 may include a primary opcode portion 282, a target register address portion 284 indicating a target register address for the result of the instruction 280, one or more source register address portions 286a-b, a secondary opcode portion 288, and a predication enable portion 290. In some embodiments, the instruction 280 comprises 32 bits, where the primary opcode portion 282 comprises 6 bits, each register address portion 284, 286a-b comprises at least five bits, the secondary opcode portion may comprise as many as six bits 288, and the predication enable portion may comprise one bit.

A pseudocode example is provided below including a plurality of instructions in an instruction stream that may be selectively predicated based on a compare instruction and utilizing the methodology disclosed herein.

```
ori g3, g3, 0d21      # set the LSB's of g3 to be 21
mffgpr f3, g3         # move to fpr 3
fcmpgt p21, f1, f2    # compare f1>f2 if greater than, set p21 bit to 1
```

-continued

```
mtspr pCount, 0x3     # set predicate counter to 3
skip_this_section_if_f1gtf2:
fadds f4, f0, f3      # f3 contains the LSBs 0d21, p21 is read, instruction
                      # isn't executed if p21==1. 0d21 is written into f4
                      LSBs
fsub f5, f0, f4       # f4 contains the LSBs 0d21. NOP if p21==1
fmul f6, f31, f5      # continued, also pCounter==0, so LSBs and enable
                      set to 0
```

In this example, one or more instructions ('ori g3, g3, 0d21' and 'mffgpr f3, g3') in the instruction stream store a predetermined predication register address (i.e., '21') in a portion of operand 'f3', where operand 'f3' is associated with a predicatable instruction 'fadds f4, f0, f3'. As used in this example, the opcodes 'fadds', 'fsubs' and 'fmuls' correspond to single precision floating point operations. As discussed herein, operands associated with such instructions may include unused dataflow bits, and as such, such instructions may be predicatable consistent with embodiments of the invention. A compare instruction 'fcmpgt p21, f1, f2' compares the operand 'f1' to the operand 'f2' to determine whether f1 is greater than f2, and the compare result (i.e., '1' if 'f1' is greater than 'f2; and '0' if 'f1' is not greater than 'f2') is stored at predication register address 'p21'. An instruction 'mtspr pCount, 0x3' sets a counter register 'pCount' to indicate the number of subsequent instructions that may be selectively predicated. As shown, 'fadds f4, f0, f3' includes the operand 'f3' which includes a portion (e.g., some unused dataflow bits) having the stored value '21'. As such, when decoding 'fadds f4, f0, f3', predication logic consistent with embodiments of the invention may selectively predicate 'fadds f4, f0, f3' based on the compare result stored at predication register address 'p21'. Furthermore, as shown a second instruction 'fsub f5, f0, f4' follows a first instruction 'fadds f4, f0, f3' in the instruction stream, the second instruction utilizes a target operand 'f4' of the first instruction as a source instruction. Hence, the result data from the first instruction is stored at a source operand of the second instruction. As discussed previously, the portion of an operand indicating a predication register address may be passed to a target operand of a first instruction, such that a second subsequent instruction in the instruction stream that depends on the result data of the fist may include the same portion of the operand, and such that the second instruction may be selectively predicated similar to the first instruction.

While the preceding example included single precision floating point instructions, such instructions are only one example of types of instructions that may be considered predicatable consistent with embodiments of the invention. Types of instructions that may be considered predicatable consistent with embodiments of the invention include instructions that may be associated with operands having unused dataflow bits. Such unused dataflow bits may be considered bits of an operand that are not-logically significant for a type of instruction, and/or bits of an operand that may be rounded off. Instructions which may include such unused dataflow bits may include, for example, single precision floating point type instructions, estimate instructions, and/or iterative math instructions that may be rounded off.

Embodiments of the invention utilize a portion of an operand associated with an instruction to indicate a predication register address which may be utilized to determine whether to predicate the instruction. Advantageously, embodiments of the invention facilitate predication of instructions without dedicating valuable instruction bits to a predication field.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method of executing instructions in an instruction stream in a processor, the method comprising:
   executing a first compare instruction to generate a compare result and setting a value corresponding to a register address of a predication register based on the compare result;
   for a second instruction that addresses an operand stored in a register file, analyzing a portion of the operand stored in the register file to determine the register address of the predication register;
   selectively predicating the second instruction based at least in part on the value corresponding to the register address of the predication register to generate predicated result data, wherein the predicated result data includes the portion of the operand associated with the second instruction;
   analyzing a portion of an operand associated with a third instruction in the instruction stream to determine the register address of the predication register, wherein the operand of the third instruction is the predicated result data of the second instruction; and
   selectively predicating the third instruction based at least in part on the value corresponding to the register address of the predication register.

2. The method of claim 1, further comprising setting the portion of the operand associated with the second instruction to the value corresponding to the register address of the predication register.

3. The method of claim 1, wherein the portion of the operand comprises a plurality of bits of least significance in the operand.

4. The method of claim 1, wherein the second instruction includes a predication enable bit, wherein analyzing a portion of an operand associated with the second instruction is in response to the predication enable bit being a first value.

5. The method of claim 1, wherein selectively predicating the second instruction includes communicating a predication enable signal to an execution unit of the processor, the predication enable signal indicating to predicate the second instruction.

6. The method of claim 1, the method further comprising:
   storing a count value in a counter register associated with the processor prior to decoding the second instruction, wherein the count value indicates a number of instructions in the instruction stream that may be predicated based on the compare result, and
   wherein selectively predicating the second instruction is based at least in part on whether the counter register is greater than zero.

7. The method of claim 1, wherein the second instruction includes an enable bit indicating whether the second instruction is a predicatable instruction, and wherein analyzing the portion of the second instruction to determine the register address of the predication register and selectively predicating the second instruction based at least in part on the value corresponding to the register address of the predication register is in response to determining that the enable bit indicates that the second instruction is a predicatable instruction.

8. The method of claim 1, wherein analyzing the portion of the operand associated with the second instruction to determine the register address of the predication register includes accessing the register file storing the operand.

9. The method of claim 1, wherein selectively predicating the second instruction based at least in part on the value corresponding to the register address of the predication register includes accessing a special purpose register file storing the predication register to determine the value corresponding to the register address of the predication register.

10. The method of claim 1, wherein analyzing the portion of the operand stored in the register file is performed in parallel with decoding the second instruction.

11. A circuit arrangement, comprising:
    a processing unit;
    a register file disposed in the processing unit configured to store a plurality of operands;
    a predication register disposed in the processing unit;
    an execution unit disposed in the processing unit configured to execute a first compare instruction to generate a compare result and set a value corresponding to a register address of the predication register based on the compare result;
    predication logic disposed in the processing unit and configured to, for a second instruction that addresses an operand stored in the register file, access the register file to analyze a portion of the operand addressed by the second instruction to determine the register address of the predication register, and selectively predicate the second instruction based at least in part on the value corresponding to the register address of the predication register;
    wherein the execution unit is configured to generate predicated result data based on the predication of the second instruction, wherein the predicated result data includes the portion of the operand associated with the second instruction, wherein the predication logic is configured to analyze a portion of an operand associated with a third instruction to determine the register address of the predication register, wherein the operand associated with the third instruction is the predicated result data of the second instruction, and wherein the predication logic is configured to selectively predicate the third instruction based at least in part on the value corresponding to the register address of the predication register.

12. The circuit arrangement of claim 11, wherein the execution unit is configured to set the portion of the operand associated with the second instruction to the value corresponding to the register address of the predication register.

13. The circuit arrangement of claim 11, wherein the portion of the operand corresponds to a plurality of bits of least significance in the operand.

14. The circuit arrangement of claim 11, wherein the second instruction includes a predication enable bit, and wherein the predication logic is configured to analyze the portion of the operand associated with the second instruction in response to the predication bit being a first value.

15. The circuit arrangement of claim 11, wherein the predication logic selectively predicates the second instruction by communicating a predication enable signal to the execution unit.

16. The circuit arrangement of claim 11, wherein the predication logic includes a counter register configured to store a count value, wherein the count value indicates a number of instructions in an instruction stream that may be predicated based on the compare result, and
    wherein the predication logic selectively predicates the second instruction based at least in part on whether the counter register is greater than zero.

17. The circuit arrangement of claim 11, wherein the second instruction includes an enable bit indicating whether the second instruction is a predicatable instruction, and wherein the predication logic is configured to analyze the portion of the second instruction to determine the register address of the predication register and selectively predicate the second instruction based at least in part on the value corresponding to the register address of the predication register in response to determining that the enable bit indicates that the second instruction is a predicatable instruction.

18. The circuit arrangement of claim 11, further comprising:
    decode logic disposed in the processing unit and configured to decode the second instruction, and wherein the predication logic is configured to analyze the portion of the operand associated with the second instruction in parallel with the decode logic decoding the second instruction.

19. An integrated circuit device comprising the circuit arrangement of claim 11.

20. A program product comprising a non-transitory computer readable medium and logic definition program code resident on the computer readable medium and defining the circuit arrangement of claim 11.

* * * * *